Figure 3:
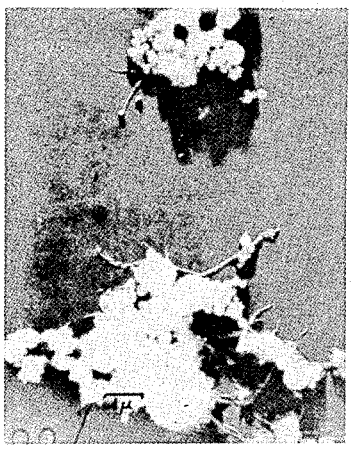
Figure 4:
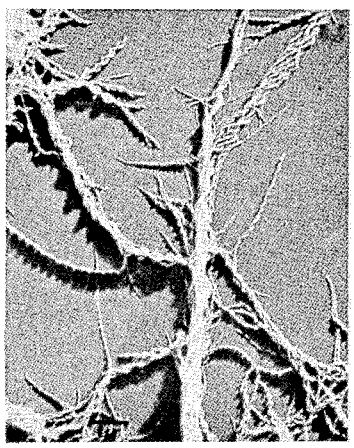

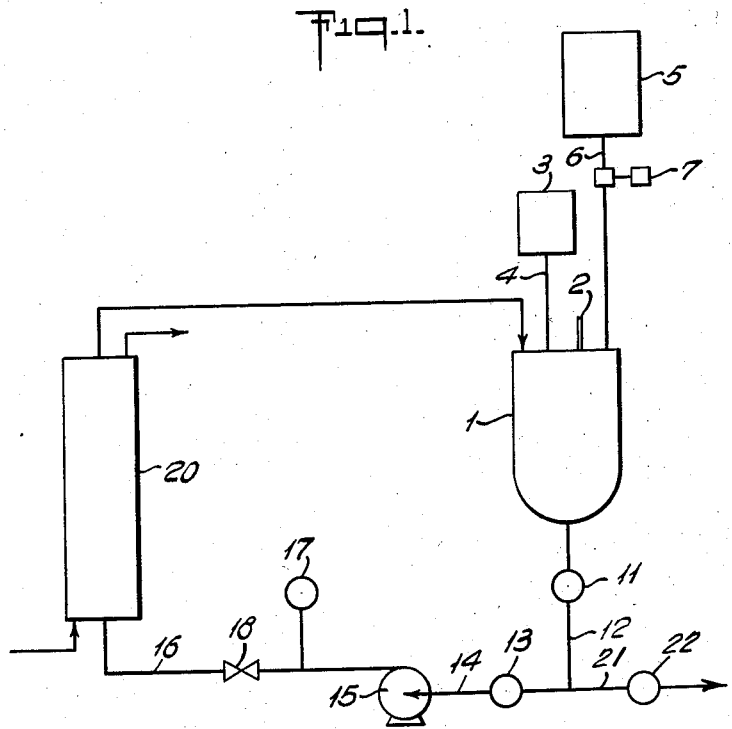
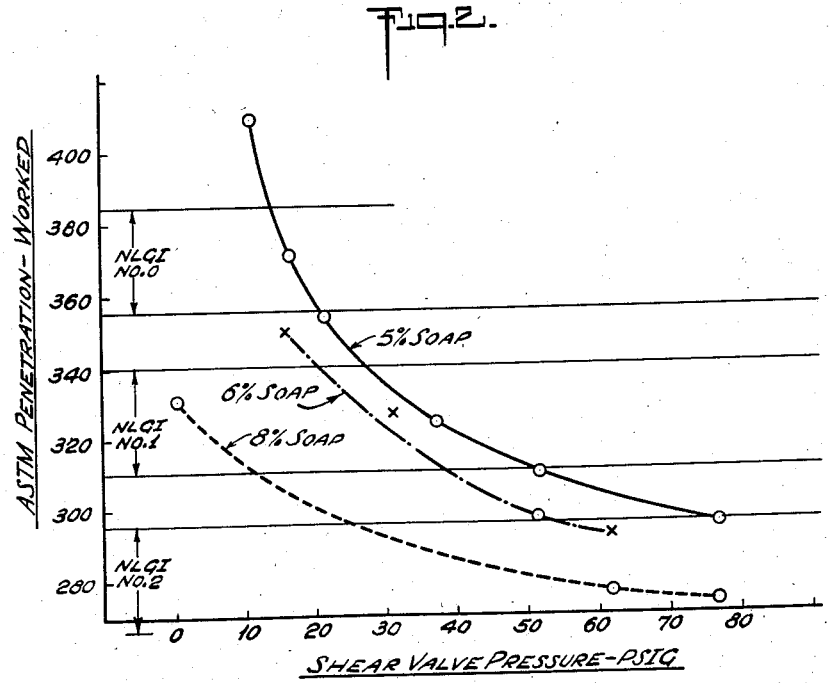

United States Patent Office 2,886,525
Patented May 12, 1959

2,886,525

METHOD OF GREASE MANUFACTURE WHICH COMPRISES SHEARING THE GREASE MIXTURE AT HIGH TEMPERATURES

John P. Dilworth, Brinckerhoff, Terence B. Jordan, Fishkill, and Bill L. Benge, Clinton Hollow, N.Y., assignors to The Texas Company, New York, N.Y., a corporation of Delaware Application June 6, 1955, Serial No. 513,282

16 Claims. (Cl. 252—32)

This invention relates to improvements in the manufacture of lubricating greases. More particularly, it relates to an improved process for the manufacture of greases thickened with lithium soaps of hydroxy fatty acids.

The conventional method employed in the manufacture of greases which are difficult to prepare in satisfactorily smooth form, such as greases thickened with lithium soaps of hydroxy fatty acids, comprises "shock" cooling a hot grease mixture, either statically or with agitation, so that the soap crystallizes in the form of very fine particles. Recently, methods have been developed which involve cooling the grease mixture at a relatively low rate while employing various techniques for the avoidance or reduction of super-cooling. These methods are very advantageous from an operational standpoint, since they obviate the necessity for obtaining extremely rapid mixing or heat transfer in a large bulk of grease, and they have the further advantage that the gelation takes place with the formation of long slender soap fibers, which impart increased gel strength and other desirable properties to the grease. However, these long fibers have a strong tendency to agglomerate during the stirring or other agitation which is employed in these methods, and the agglomerates formed are not completely separated by milling the grease according to the conventional procedures. This difficulty therefore results in a deterioration in obtainable yields and product quality.

In accordance with this invention, greases are produced by an improved method which comprises heating a mixture of a soap and a suitable oleaginous liquid in grease forming proportions up to a temperature above the solution temperature of the soap, so as to form a homogeneous liquid mixture of the soap and the oleaginous liquid, and then cooling the mixture at a relatively low rate, while subjecting it to an effective shearing action at a temperature within the transition temperature range. Preferably, the grease mixture is recycled continuously through a shearing means while it is at a temperature or temperatures within this range.

By transition temperature range is meant the temperature range in the neighborhood of the solution temperature of the soap wherein the maximum thermal effect is obtained during cooling. This temperature effect is associated with the crystallization of the soap, and shows up as a more or less sharp peak on the temperature differential curve. It ordinarily extends over about a 25° F. temperature range from about the solution temperature of the soap. For a lithium 12-hydroxy-stearate soap, this transition range is from about 390° F. to about 360° F., as shown by the temperature differential curve.

In carrying out the preparation of the lithium hydroxy fatty acid grease by this method, the mixture of soap and oleaginous liquid is heated to at least about 385° F., preferably to a temperature in the range from about 390° F. to about 405° F., and cooled at a rate below about 25° F. per minute, and preferably at a rate below about 15° F. per minute, while it is subjected to shearing at a temperature between about 385° F. and about 360° F. The shearing is preferably carried out continuously upon the grease mixture while it is being cooled through this temperature range, and very advantageously while it is being cooled from about 390° F. to about 350° F.

The shearing means employed is preferably of the type which gives a very effective shearing and dispersing action with only a small amount of kneading action. A particularly suitable device for this purpose is a shear valve, through which the grease mixture is passed with a substantial pressure drop into a confined passageway, so that a strong turbulence is set up in the fluid mixture. We have found that when the grease mixture is passed at a high temperature in the vicinity of the solution temperature of the soap through such a valve with a sufficiently high pressure drop, the soap fibers are very effectively separated and dispersed without any material breaking or thickening such as occurs when the grease is subjected to substantial kneading action during cooling. The grease thus obtained comprises a system of long slender intermeshed soap fibers, the degree of dispersal of the fibers, and consequently the yield and product quality of the grease, being directly related to the pressure drop across the valve. The effect of increased pressure drop across the valve is particularly important up to about 75 pounds per square inch, but substantial improvements are obtained at higher pressures, up to about 200 pounds per square inch or higher.

Fig. 1 is a diagrammatic illustration of one form of apparatus suitable for making greases in accordance with the preferred embodiment of our invention.

Fig. 2 is a chart showing the relationship between the yields obtainable and the back pressure maintained upon the shear valve, when the grease preparation is carried out with recycling of the grease mixture through the valve at high temperatures during cooling. The pressure drop across the valve in these runs was lower than the valve back pressures shown by the weight of the grease in the recycle line after the valve, which amounted to about 3 pounds per square inch.

Figs. 3 to 12, inclusive, are electron micrographs showing the variations in soap structure obtained by employing different gelation conditions, including different amounts of types of shearing.

Referring in more detail to Fig. 1, numeral 1 represents a jacketed grease kettle equipped with stirrer 2 and adapted to be heated to elevated temperatures above about 400° F. A grease mixture, comprising a slurry of a soap and an oleaginous liquid, obtained either by introducing a preformed soap and an oleaginous liquid into the kettle or by saponification in situ, is heated in the kettle at an elevated temperature above the solution temperature of the soap for a sufficient time to obtain a molten homogeneous mixture of soap and oil, or one which appears to be so to the unaided eye. When the slurry is obtained by saponification in situ, a soap-forming fatty material is charged into the kettle together with all or a portion of the oleaginous material included in the grease and a solution of a suitable basic material introduced from tank 3 by way of line 4. The contents of the kettle are then heated with stirring until the saponification is complete and for a further period at a somewhat higher temperature to accomplish dehydration. When only a portion of the oleaginous liquid included in the grease is added to the original charge, the remainder may be suitably added following the dehydration, by means of tank 5 through line 6, having included therein pump 7. Any additives employed in the grease, such as oxidation inhibitors, corrosion inhibitors, etc., may be added during the cooling down process, preferably when the temperature of the grease is in the range between the melting point of the additive and its decomposition or volatilization temperature.

The hot grease mixture, obtained as described above, is maintained with stirring or other agitation while it is cooled at a relatively low rate from a temperature above the solution temperature of the soap until a grease consistency is obtained. During the cooling, and while the mixture is at an elevated temperature near the solution temperature of the soap, a stream of the mixture is continuously withdrawn from the kettle and recycled through shearing means 18. The recycle stream is withdrawn through lines 12 and 14, containing valves 11 and 13, passes through pump 15, pressure gauge 17 and shearing means 18, and returns to the kettle by way of line 16, which may contain heat exchanger 20. Shearing means 18 is preferably a shear valve, such as a plug cock valve, gate valve, or globe valve, through which the grease mixture is forced under a substantial pressure, preferably such that the pressure drop across the valve is at least about 10 pounds per square inch, obtained by suitably adjusting the setting of the valve and the operation of pump 15.

Recycling through shearing means 18 is preferably initiated while the grease mixture is at a temperature of at least about the solution temperature of the soap and carried out continuously during the cooling to a temperature at least about 10° F. below the solution temperature of the soap. The recycling is suitably carried out at a rate such as to give at least about 0.13 batch turnover per minute, and preferably about 0.4 batch turnover per minute. Very advantageously, the shearing may be continued until the grease mixture has cooled through the transition temperature range, or at least to about 25° F. below the solution temperature of the soap, with at least one batch turnover in the transition temperature range and preferably with at least one batch turnover in the 10° F. range below the solution temperature of the soap. It may be continued until the grease has cooled to a lower temperature if desired.

Cooling of the grease mixture may be obtained by means of heat exchanger 20, which may be any suitable heat exchanger capable of affording the necessary amount of cooling, such as a conventional shell and tube exchanger. Additionally or alternatively, cooling may be obtained by passing water or other cooling liquid through the kettle jacket. According to the preferred procedure, the grease mixture is recycled continuously through heat exchanger 20 while the mixture is cooled from a temperature above the solution temperature of the soap until a grease consistency is obtained. Stirring of the kettle contents is preferably employed during the cooling in order to maintain a strong agitation of the grease mixture. In some cases, recycling through heat exchanger 20 is advantageously continued for a considerably longer period, such as down to a sufficiently low temperature for packaging directly. Shearing of the recycle stream by shearing means 18 may be carried out during the entire time that the grease is recycled, or it may be discontinued after the desired effect has been obtained. The grease mixture is finally withdrawn through line 21, containing valve 22.

When a shear valve is employed as the shearing means, a grease of optimum quality and yield may be obtained directly, without the necessity for milling. When a shearing means of a different type is employed, such as a Chaffee Disc Disperser, the product is preferably finished in the usual way by milling, suitably by passing it through a colloid mill. The cooled and sheared product, either with or without milling, may be mixed with additional lubricating oil if desired in order to adjust the penetration and soap content.

The method of this invention may be employed advantageously in grease manufacture generally, such as for example in the manufacture of greases thickened with soaps of sodium, potassium, lithium, calcium, barium, strontium, aluminum or lead, or mixtures of such soaps. The saponifiable material employed in the production of these soaps may be a higher fatty acid containing from about 10 to 32 carbon atoms, or the glyceride or other ester thereof, such as myristic acid, palmitic acid, stearic acid, behenic acid, oleic acid, tallow, hydrogenated fish fatty oils, etc. The production of greases thickened with lithium soaps of hydroxy fatty acids is regarded as a particularly important application of the invention because of the increasing commercial importance of such greases and the large amount of difficulty which has been experienced in their manufacture.

Suitable soap-forming hydroxy fatty acid materials which may be employed in the production of the lithium hydroxy fatty acid greases are essentially saturated hydroxy fatty acids containing 12 or more carbon atoms and one or more hydroxyl radicals separated from the carboxyl group by at least one carbon atom, the glycerides of such acids and the lower alkyl esters of such acids. Preferably the acid contains about 16 to about 22 carbon atoms. Such materials may be obtained from naturally occurring glycerides, by hydroxylation of fatty acids, by hydrogenation of ricinoleic acid or castor oil, or otherwise by processes such as the catalytic oxidation of hydrocarbon oils and waxes which have been extracted and fractionated to the desired molecular range. Particularly suitable materials of this character are hydrogenated castor oil, 12-hydroxystearic acid and the methyl ester of 12-hydroxystearic acid.

The oleaginous liquids employed in the greases produced by the method of this invention may be any suitable oils of lubricating characteristics, including the conventional mineral lubricating oils, the synthetic lubricating oils prepared by cracking and polymerizing products of the Fischer-Tropsch process and the like, as well as other synthetic oleaginous compounds such as polyesters, polyethers, etc., within the lubricating oil viscosity range. Such synthetic oleaginous compounds, including mixtures thereof, may be substituted in whole or in part for the conventional mineral lubricating oils. Examples of these compounds are the aliphatic dicarboxylic acid di-esters, such as di-2-ethyl hexyl sebacate, di(secondary amyl) sebacate, di-2-ethyl hexyl azelate, di-isooctyl adipate, etc. Suitable mineral oils are those having viscosities in the range from about 100 to 2,000 seconds Saybolt Universal at 100° F., and may be either naphthenic or paraffinic in type, or blends of the two. When the saponification is carried out in the presence of a portion of the oil included in the grease, an oil which is not hydrolyzed under the saponification conditions is preferably employed for this purpose, most suitably a mineral oil fraction.

The greases may also contain various additives of the usual types such as corrosion inhibitors, oxidation inhibitors, antiwear agents, extreme pressure agents and so forth. Preferably, they contain an oxidation inhibitor, which may suitably be an oxidation inhibitor of the amine type, such as diphenylamine, phenyl alpha naphthylamine or tetramethyl diamino diphenyl methane. Compounds of this type may be added either before or during the cooling down process. They are preferably added while the temperature of the grease is between about 300° F. and about 180° F.

A series of lithium 12-hydroxystearate greases was prepared in accordance with the preferred embodiment of the invention by cooling a body of grease mixture at a relatively low rate with recycling through a shearing device in the critical temperature range from about 390° F. to about 360° F. The greases contained from about 3 to 15% of lithium 12-hydroxystearate, obtained by the saponification of 12-hydroxystearic acid, hydrogenated castor oil and the methyl ester of 12-hydroxystearic acid. The method employed is described in detail in the following examples.

EXAMPLE 1

A grease was prepared containing 8.0% of lithium 12-hydroxystearate as the thickening agent in a base oil which was a refined distillate oil having a Saybolt Universal viscosity at 100° F. of 347 seconds, from a mixed base crude.

The saponifiable material employed in the preparation was the methyl ester of 12-hydroxystearic acid. This was a commercial product having a saponification number of 174, a neutralization number of 4.1 and a hydroxy number of 163.

The grease was prepared in a 60 pound batch, in a conventional fire heated and paddle stirred laboratory kettle, provided with a recycle line as shown in Fig. 1. The recycle line consisted of 1 and 1½ inch pipes, about 8 feet long and containing a Walworth No. 3 1½ inch gate valve and a water-cooled concentric tube exchanger about 4 feet long wherein the grease passage was between a ⅜ inch and a 1 inch pipe.

The grease mixture was obtained by saponifying the fatty acid material with lithium hydroxide in the form of an approximately 10 percent aqueous solution in the presence of about one third of the lubricating oil employed in the grease. The saponification was carried out at a temperature of about 160–220° F., for about one hour, and the mass dehydrated by heating for an additional hour at about 270–300° F. Following the dehydration, the remainder of the oil was added and the mixture heated to about 395–405° F. in order to completely melt the soap. Stirring of the kettle contents was carried out continuously during the preparation of the grease mixture and the subsequent cooling process.

The above grease was cooled from 400° F. to 200° F. by circulation through the recycle line containing the external cooler at a rate of about 50 pounds per minute, which resulted in a cooling rate of the body of the grease of about 4° F. per minute in the 400–350° F. range and about 3.4° F. per minute in the 400–300° F. range. Shearing was performed upon the mixture during the recycling by maintaining a pressure of 75 pounds per square inch upon the valve.

Figure 5:
Figure 6:
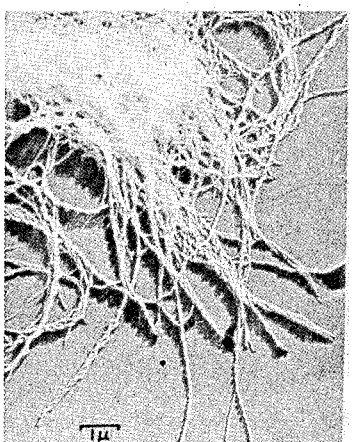

Figs. 3–6, inclusive, show the effect of the slow cooling together with shearing upon the fiber development in this grease. Figs. 3–6 are electron milrographs made upon samples of the grease drawn at 400 F., 380° F., 350° F. and 208° F., respectively. As shown by these pictures, the fiber development clearly takes place only in the region of phase transformation, which was found by independent thermal analysis to be between 390° F. and 360° F. for this soap. Though no fiber structure appears to exist at 400° F., the fiber formation is well established by cooling with shearing at 380° F. and almost completed by 350° F. Mechanical action, thereafter, only chops up the fibers and assists, to a minor degree, in reducing fiber width of the agglomerates and in breaking up the sheaves of fibers (Figs. 5 and 6).

The relationship between fiber structure and yield may be seen by the following penetration values obtained upon the samples taken during the cooling.

Table I

| Drawing Temperature, °F. | Penetrations, ASTM, 77° F. | |
|---|---|---|
|  | Unworked | Worked, 60 Strokes |
| 400 | 329 | 426 |
| 380 | 240 | 280 |
| 350 | 277 | 277 |
| 290 | 291 | 272 |
| 200 | 280 | 275 |

As shown by the above table, the major effect upon grease consistency was obtained by shearing between 400° F. and about 380° F. This correlates with the fiber development as shown in Figs. 3–6, inclusive.

Figure 7:
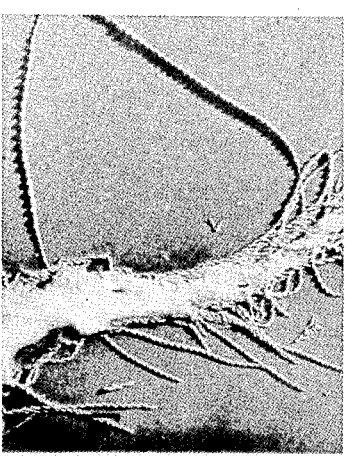
Figure 8:
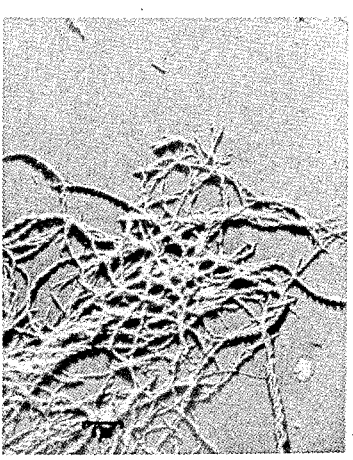

Figs. 7 and 8 show the criticality of shearing the grease mixture in the transition temperature range during the fiber formation. Figs. 7 and 8 are micrographs obtained upon a grease of the same composition as described above, prepared so as to obtain long, well flocculated fibers (Fig. 1) at 350° F., and then cooled to 200° F. by recycling in the manner described through the external cooler and shear valve, with a back pressure of 75 pounds per square inch. As shown in Fig. 8, the breaking up of the well-formed fiber flocks was accompanied by considerable fiber destruction. This is in marked contrast to the result obtained when the mixture was recycled continuously through the shear valve during the cooling from 400° F., as shown by a comparison of Fig. 8 with Figs. 5 and 6. This difference in fiber structure was reflected in the lower yield obtained, this grease having an unworked penetration, ASTM, at 77° F. of 386 and a worked penetration of 341.

EXAMPLE 2

A series of batches of a 6.0% lithium 12-hydroxystearate grease were prepared in the manner described in Example 1 but with different amounts of shearing during the cooling process. A slightly different base oil was employed in these greases, comprising a 17:83 blend of a light refined paraffinic distillate oil having a Saybolt Universal viscosity at 100° F. of 176.3 seconds and a refined residual motor oil but somewhat heavier than that employed in Example 1, having a Saybolt Universal viscosity at 100° F. of 664.6 seconds.

Figure 9:
Figure 10:
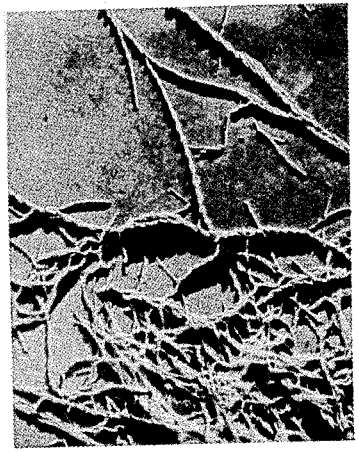
Figure 11:
Figure 12:
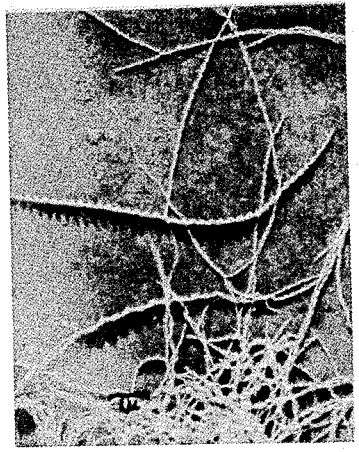

Figs. 9–12, inclusive, show the effect of different shearing methods employed during the cooling upon the fiber formation in this grease. Fig. 9 is a micrograph obtained upon the grease which was cooled down with stirring as the only shearing means employed, and milled at a temperature below 200° F. Fig. 10 is a micrograph obtained upon a grease which was circulated through a Chaffee Disc Disperser during the cooling from 400° F. to 200° F. Figs. 11 and 12 are micrographs obtained upon greases which were recirculated through a shear valve during cooling from 400° F. to 200° F. as described in Example 1, with back pressures upon the valve of 15 pounds per square inch and 50 pounds per square inch, respectively. All of the batches were cooled at the same rate of about 4° F. per minute in the 400–350° F. range and about 3.4° F. per minute in the 400–300° F. range.

As shown by Figs. 9–12, the fiber structure of the greases obtained by slow cooling with shearing differed markedly according to the shearing means employed. Stirring alone, followed by milling, produced broken, uneven fibers with only a small amount of twist (Fig. 9). By circulating the grease mixture through a Chaffee Disc Disperser during the cooling, a system of well-formed, intermeshed fibers was obtained (Fig. 10). By circulating the grease mixture through a shear valve, very long fibers with a high degree of twist were obtained, the degree of dispersion being directly related to the pressure on the valve (Figs. 11 and 12). The increased dispersing action obtained with higher pressures on the valve does not appreciably alter the structure of the individual fibers, but the fibers are more thoroughly separated and intermeshed.

The penetration data given in the following table shows the relationship between the yields obtained and the shearing methods employed. All of the greases of this table were of the same composition and obtained in the same manner except for the cooling method employed.

Table II

| Procedure | Penetration, ASTM, 77° F. | |
|---|---|---|
|  | Unworked | Worked, 60 Strokes |
| Stirring, followed by milling | 400+ | 400+ |
| Chaffee Disc Disperser, 400–200° F | 352 | 321 |
| Shear valve, 15 p.s.i. back pressure, 400–200° F | 400+ | 350 |
| Shear valve, 30 p.s.i. back pressure, 400–200° F | 371 | 327 |
| Shear valve, 50 p.s.i. back pressure, 400–200° F | 332 | 292 |

As shown by the above table, circulation of the grease mixture through a Chaffee Disc Disperser or a shear valve operated with about 30 pounds per square inch back pressure during the cooling resulted in about equivalent yields. By circulating the mixture through the shear valve with pressures above about 30 pounds per square inch, very substantially increased yields were obtained over those obtainable with the Chaffee Disc Disperser.

Fig. 2 shows graphically the relationship between the yields obtained and the back pressure upon the valve when the preparation is carried out with recirculation through a shear valve during cooling. The curves given therein are based upon data obtained upon different batches of the greases of Examples 1 and 2, and also of a 5 percent lithium 12-hydroxy-stearate grease, prepared in the manner described but with different pressures upon the valve. As shown by these curves, a grease of a given soap content was obtainable in as many as three N.L.G.I. grades merely by varying the pressure upon the valve within the range from about 10 to about 75 pounds per square inch. By operating with a valve back pressure of 180–200 pounds per square inch, a grease of the same composition, containing 5 percent soap, was obtained having a worked penetration of 259.

The above greases prepared in accordance with the method of this invention were of smooth, buttery texture and possessed very superior lubricating properties generally, including high mechanical stability as shown by the following table.

Table III

| Penetration | Example 1 | Example 2 |
|---|---|---|
| Unworked | 280 | 400+ |
| Worked: 60 Strokes | 275 | 350 |
| 100,000 Strokes | 291 | 324 |
| After Shell Roll Test, 4 hr., Room Temperature | 273 | 313 |
| After Dynamic Shear Test, 8 hr., 225° F | 295 | 298 |

The Shell Roll Test and the Dynamic Shear Test of the above table are well known tests for determining the resistance of a grease to change upon working of the type to which the grease is subjected in bearing lubrication. In the Shell Roll Test, a sample of the grease (worked, 60 strokes) is placed in a cylinder containing a weighted roller and the assembly rotated for four hours. In the Dynamic Shear Test, the grease is subjected to shearing action, obtained by means of a perforated piston reciprocating within a closed cylinder.

As shown by the data given in Table III, both of the greases prepared in accordance with this invention had very satisfactory working stability under the different test conditions, although the grease of Example 1, prepared with a shear valve back pressure of 75 pounds per square inch, was superior to the grease of Example 2, prepared with a shear valve back pressure of 30 pounds per square inch.

Obviously many modifications and variations of the invention, as hereinbefore set forth, may be made without departing from the spirit and scope thereof and, therefore, only such limitations should be imposed as are indicated in the appended claims.

We claim:

1. The method of preparing a lubricating grease which comprises providing a molten homogeneous mixture of a soap and an oleaginous liquid in grease forming proportions at an elevated temperature above the solution temperature but below the decomposition temperature of the soap, maintaining a body of relatively large volume of the said mixture with agitation while cooling it at a rate below 25° F. per minute until a grease consistency is obtained, and subjecting the said mixture to a shearing action at a temperature in the transition temperature range by continuously withdrawing a recycle stream of relatively small volume from the maintained body of the mixture, passing it under pressure through a restricted orifice into a confined passageway, with a pressure drop of about 10–200 pounds per square inch across said orifice, and then returning it to the said maintained body of the mixture at a batch turnover rate of at least about 0.13 per minute until the volume of the recycled mixture is at least equal to the total volume of the said mixture.

2. The method of claim 1 wherein recycling through the said restricted orifice is carried out continuously while the said mixture is cooled from above the solution temperature of the soap to at least about 10° F. below the solution temperature of the soap.

3. The method of claim 1 wherein recycling through the said restricted orifice is carried out continuously while the said mixture is cooled from above the solution temperature of the soap down to a temperature about 25° F. below the said solution temperature.

4. The method of claim 1 wherein the said recycle stream is passed through a cooler after passing through the said restricted orifice.

5. The method of claim 1 wherein the said soap is a lithium soap.

6. The method of claim 1 wherein the said soap is a lithium soap of a soap-forming hydroxy fatty acid material.

7. The method of preparing a grease containing as the thickening agent a lithium soap of a substantially saturated soap-forming hydroxy fatty acid material, which comprises providing a molten homogeneous mixture of said lithium soap and an oleaginous liquid in grease forming proportions at a temperature above about 385° F. but below the decomposition temperature of the soap, maintaining a body of relatively large volume of the said mixture with agitation while reducing the temperature thereof at a rate below about 25° F. per minute until a grease consistency is obtained, and subjecting the said mixture to a shearing action at a temperature between about 385° F. and about 360° F. by continuously withdrawing a recycle stream of relatively small volume from the maintained body of the mixture, passing it under pressure through a restricted orifice into a confined passageway, with a pressure drop of about 10–200 pounds per square inch across said orifice, and returning it to the said maintained body of the mixture at a batch turnover rate of at least about 0.13 per minute until the volume of recycled mixture is at least equal to the total volume of the said mixture.

8. The method of claim 7 wherein recycling of the said mixture through the said restricted orifice is carried out continuously while the said mixture is cooled from a temperature of about 390° F. to about 360° F.

9. The method of claim 8 wherein recycling of the said mixture through the said restricted orifice is carried out at such a rate that the volume of grease recycled per minute is about equal to the total volume of the said mixture.

10. The method of preparing a lithium 12-hydroxystearate grease which comprises providing a molten homogeneous mixture of lithium 12-hydroxystearate and an oleaginous liquid in grease forming proportions at a temperature of about 390° F.–405° F., maintaining a body of relatively large volume of the said mixture with agitation while reducing the temperature thereof at a rate below about 15° F. per minute until a grease consistency is obtained, and continuously subjecting the said mixture to a shearing action while it is being cooled from about 390° F. to about 360° F. by continuously withdrawing a recycle stream of relatively small volume, passing it through a restricted orifice into a confined passageway with a pressure drop across said orifice of about 10–200 pounds per square inch, and returning it to the said maintained body of the mixture at a batch turnover rate of at least about 0.4 per minute until the volume of recycled mixture while the said mixture is at a temperature of 390° F.–360° F., is at least equal to the total volume of the said mixture.

11. The method of claim 10 wherein recycling of the said mixture through the said restricted orifice is carried out continuously during cooling of the said mixture from about 400° F. to about 350° F.

12. The method of claim 10 wherein the pressure drop across said restricted orifice is from about 25 to about 75 pounds per square inch.

13. The method of claim 10 wherein the said recycle stream is passed through a cooler after passing through said restricted orifice.

14. The method of claim 10 wherein the said oleaginous liquid is a mineral lubricating oil.

15. The method of grease manufacture which comprises providing a molten homogeneous mixture of a soap and an oleaginous liquid in grease forming proportions at an elevated temperature above the solution temperature but below the decomposition temperature of the soap, and controlling the crystallization of the said soap during cooling by maintaining a body of relatively large volume of the said mixture with agitation while reducing the temperature thereof at a rate below about 25° F. per minute until a grease consistency is obtained by continuously withdrawing a stream of relatively small volume from said body of mixture, passing the said stream through a shearing device wherein the shearing action is obtained principally by means of turbulence imparted to the said stream; and then through an external cooler wherein it is cooled to a temperature below the gelation temperature of the said mixture, and finally returning the said stream to the maintained body of mixture at a batch turnover rate of a least about 0.13 per minute while the grease mixture is in the transition temperature range until the volume of the recycled grease mixture is at least equal to the total volume of the said mixture.

16. The method of claim 15 wherein the said body of mixture is cooled at a rate below about 15° F. per minute.

References Cited in the file of this patent
UNITED STATES PATENTS

| | | |
|---|---|---|
| 2,646,401 | O'Halloran | July 21, 1953 |
| 2,652,366 | Jones et al. | Sept. 15, 1953 |